(12) United States Patent  
Henrekson

(10) Patent No.: US 9,126,763 B2  
(45) Date of Patent: Sep. 8, 2015

(54) TRANSPORT CHAIN AND TRANSPORT CHAIN SYSTEM

(71) Applicant: Carryline AB, Kungalv (SE)

(72) Inventor: Dag Henrekson, Kungalv (SE)

(73) Assignee: CARRYLINE AB, Kungalv (SE)

( * ) Notice: Subject to any disclaimer, the term of this patent is extended or adjusted under 35 U.S.C. 154(b) by 0 days.

(21) Appl. No.: 14/283,840

(22) Filed: May 21, 2014

(65) Prior Publication Data

US 2014/0346016 A1 Nov. 27, 2014

(30) Foreign Application Priority Data

May 24, 2013 (SE) ...................................... 1350634

(51) Int. Cl.
*B65G 17/06* (2006.01)
*B65G 15/48* (2006.01)
*B65G 17/44* (2006.01)

(52) U.S. Cl.
CPC .............. *B65G 15/48* (2013.01); *B65G 17/066* (2013.01); *B65G 17/44* (2013.01); *B65G 2207/12* (2013.01)

(58) Field of Classification Search
CPC ...... B65G 17/086; B65G 17/08; B65G 17/40; B65G 17/385
USPC .................................................. 198/850–853
See application file for complete search history.

(56) References Cited

U.S. PATENT DOCUMENTS

| 3,768,631 | A | 10/1973 | Wahren | |
|---|---|---|---|---|
| 4,597,492 | A | 7/1986 | Lachonius et al. | |
| 6,250,459 | B1 * | 6/2001 | Coen et al. | 198/852 |
| 6,364,094 | B1 | 4/2002 | Alstmar | |
| 6,758,328 | B2 * | 7/2004 | Arai et al. | 198/852 |
| 6,779,652 | B2 * | 8/2004 | Baier et al. | 198/852 |
| 7,779,990 | B2 * | 8/2010 | Ferrari et al. | 198/852 |
| 7,896,766 | B2 * | 3/2011 | Mitzschke et al. | 198/852 |
| 2013/0264177 | A1 * | 10/2013 | Morris | 198/852 |

FOREIGN PATENT DOCUMENTS

| AU | 736274 | 9/1955 |
|---|---|---|
| EP | 1235000 A1 | 2/2002 |
| SE | 511811 | 11/1999 |
| WO | 9915443 | 4/1999 |

* cited by examiner

*Primary Examiner* — James R Bidwell  
(74) *Attorney, Agent, or Firm* — Gesmer Updegrove LLP

(57) ABSTRACT

Transport chain for transporting objects along a transport path in a transport direction, which transport chain comprises a plurality chain links that is interconnected using a joint segment between each chain link, which joint segment comprises a bearing element. Each chain link in the part that is located at the back in the transport direction comprises a cavity that is arranged to receive the bearing element. The bearing element is substantially spherical and comprises a plurality of through holes. The joint segment also comprises a plurality of pins that is arranged in the through holes in the bearing element and in openings in the chain link and in openings in the following chain link.

16 Claims, 3 Drawing Sheets

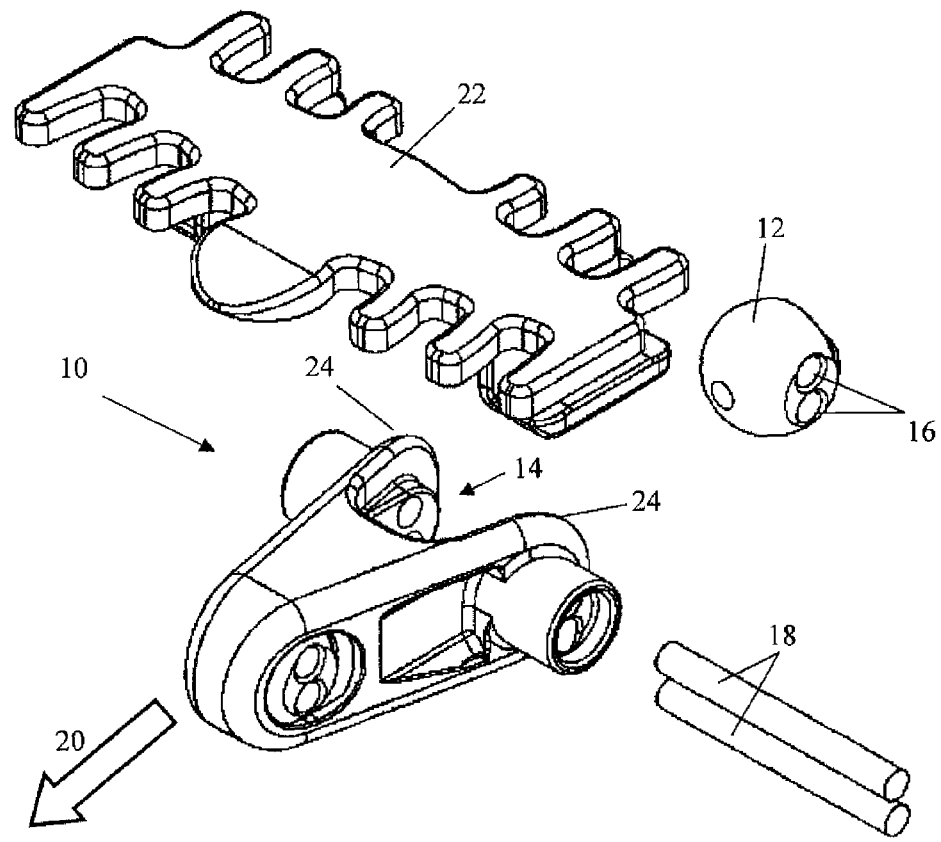
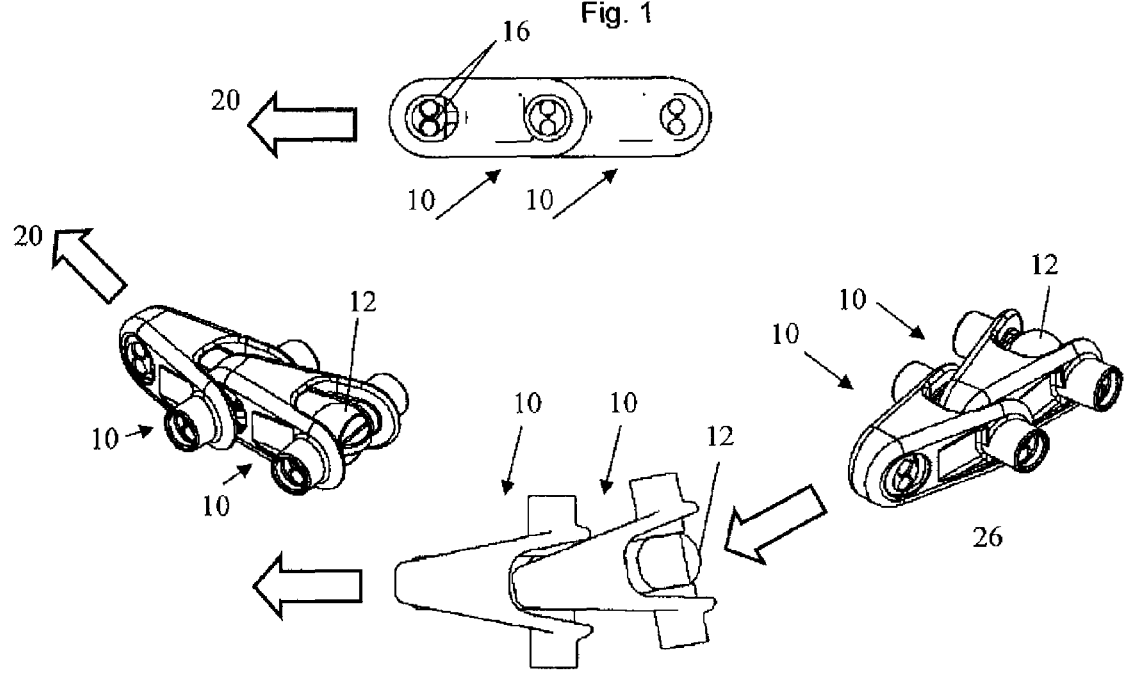
Fig. 1
Fig. 2

TRANSPORT CHAIN AND TRANSPORT CHAIN SYSTEM

PRIORITY INFORMATION

This application claims priority to SE Application No. SE1350634-0 filed on May 24, 2013, the contents of which are incorporated herein by reference in its entirety.

TECHNICAL FIELD

The present invention concerns a transport chain for transporting objects along a transport path in a direction of travel, which transport chain comprises a plurality of interconnected chain links. The present invention also concerns a transport chain system comprising a transport path and such a transport chain.

BACKGROUND OF THE INVENTION

Transport chains are used in industry to move objects from one place to another, for example in a factory. A transport chain can be constructed from a plurality of links that are similar in appearance and function and that are connected with one another. The connections between the links make it possible for the links to pivot relative to one another around two perpendicular axes of rotation which each extend with respect to the transport path's transport direction.

U.S. Pat. No. 4,597,492 describes a transport chain that consists of a plurality of identical plastic links interconnected by means of a joint segment. The joint segment has the form of a so-called Cardan joint with a steel pin that permits a vertical slewing motion, and a plastic plunge that permits lateral motion, which are mutually perpendicular and which extend in a transverse direction with respect to extension of the transport chain. The plastic links comprise a plate for carrying goods on their upper part, the underside of which constitutes a sliding surface that cooperates with the sliding surface of a conveyor beam's sliding surfaces. The body of the plastic link also has two protruding branches, which comprise holes in their central portion into which the steel pin is inserted, and which at their outer portion constitute engagement means for gear wheels on propulsion of the transport chain. This construction has a complicated structure and because of its Cardan joint results in a wide construction and thereby limits the size of the goods-carrying sliding surface against a sliding list. Another disadvantage is that the Cardan joint is not self-adjusting with respect to the main bearing that is constituted by the sliding surfaces between the goods-carrying plate's underside and the sliding list integrated into the conveyor beam.

U.S. Pat. No. 6,364,094 concerns a transport chain that consists of a plurality of identical plastic links interconnected by means of a joint segment, constructed according to the so-called ball coupling principle. Such a joint segment is constituted by a bearing element, namely a ball, and a pin centrally fixed to the ball. The pin is torsionally rigid with respect to the ball and the plastic link. The ball and the pin thereby form a fixed unit with respect to the plastic link, which fixed unit forms a pivot centre for the following plastic link. Turning motion is transmitted only via the ball. The pin's task is only to fix the ball and make it torsionally rigid.

The disadvantage of a centrally fixed pin in the ball is that the transmission of force from the ball to the following link is strongly concentrated at the nose section of the link and the ball, i.e. that part of the ball that lies at the front in the transport direction. A further disadvantage is that large demands are placed on the pin being so fixedly anchored that relative movement with respect to the ball, both radial and axial, cannot occur. This means that the pin requires both a large mounting force and also, during maintenance and repair work, a large disassembling force. Often, the special tools that are required for such mounting and disassembling work are not available at client locations where the conveyors are installed. Another disadvantage is that mounting and demounting of the ball is difficult so this is usually carried out from the side of the link and results in the formation of an opening that is larger than the diameter of the ball, which weakens the tensile strength of the construction.

The abstract of the Swedish patent no. SE 511 811 describes a plastic chain constructed according to the ball coupling principle and which comprises a ball and a pin that are manufactured as a single element from steel. The disadvantages of an integrated ball and pin are that such a component is expensive to manufacture, the wear between the steel ball and the following plastic link is relatively high and the force concentration from the ball to the following link is strongly concentrated at the nose sections of the link and the ball when the plastic chain is in use. The plastic material around the pin can therefore become deformed during use, which can create undesired play between the transport chain's components, which can in turn decrease the lifetime of the plastic chain and create noise.

SUMMARY OF THE INVENTION

An object of the present invention is to provide an improved transport chain for transporting objects, i.e. products and/or material, along a transport path in a transport direction. This object is achieved by a transport chain, which comprises a plurality, i.e. two, three, four or more chain links, which are interconnected by means of a joint segment between each individual chain link, which joint segment comprises a bearing element. Each chain link in the part at the front in the transport direction comprises a cavity that is arranged to receive said bearing element. The bearing element is substantially spherical and comprises a plurality of through holes. The joint segment also comprises a plurality of pins that are arranged in said through holes, both in the joint segment and in the following link.

Such a transport chain constructed according to the so-called ball joint principle therefore has a joint segment that does not comprise a centrally mounted pin, i.e. the joint segment does not have a pin that extends through the centre of the joint segment's bearing element. When the transport chain is in use the transmission of force from the substantially spherical bearing element to the following chain link will not therefore be strongly centred at the nose section of the chain link and the substantially spherical the bearing element, i.e. the part of the chain link and the part of the substantially spherical bearing element which lies at the front in the transport direction, but the force will be distributed over a greater contact surface. The taking up of moments will be considerably more favourable if a plurality of pins is used compared with a construction in which only one centrally mounted pin is used. The wear between the substantially spherical bearing element and the following chain link will consequently be less compared to known transport chains constructed according to the ball joint principle with joint segments that comprise a centrally fixed pin.

A transport chain according to the above also provides chain links that are pivotable with respect to one another around two perpendicular axes of rotation which each extend from the transport chain's transport direction and the joint segment is self-adjusting with respect to the main bearing, i.e. with respect to the sliding surfaces between the transport chain's underside and the sliding list integrated in a beam of a transport path. The transport chain can therefore be driven in a screw-like motion around its transport direction. The pins are used to anchor the bearing element to the chain link and for transmission of force and the taking up of moments both during horizontal and vertical turning motion from a chain link to the bearing element and further to the following link.

The expression "substantially spherical bearing element" is intended to mean a bearing element that has the shape of a sphere or of a part of a sphere, for example a sphere that lacks one or more segments, or a bearing element that has a sphere-like shape even if all of the points on its outer surface are not located at the same distance from the centre of the bearing element.

According to an embodiment of the invention said plurality of pins is arranged to provide torsional rigidity, i.e. to provide turning and rotational rigidity, for said substantially spherical bearing element and said chain link.

According to another embodiment of the invention said plurality of pins is symmetrically mounted around the centre of said substantially spherical bearing element. Alternatively, said plurality of pins is asymmetrically mounted around the centre of said substantially spherical bearing element.

According to a further embodiment of the invention said plurality of pins, and consequently the openings of the substantially spherical bearing element and the chain links, extend perpendicularly with respect to the transport direction, i.e. in a transverse direction in relation to the extension of the transport chain.

It should be noted that not all of the pins of said plurality of pins necessarily need to have the same shape, the same cross-section, the same dimensions, the same extension through the substantially spherical bearing element and/or be made of the same material.

According to an embodiment of the invention said chain link comprises a separate goods-carrying portion, i.e. a load-carrying surface that covers at least one part of the chain link's upper side when the transport chain is in use, which goods-carrying portion is arranged to be attached to said chain link, i.e. the chain link and the goods-carrying portion do not constitute an integrated element. The chain link and the goods-carrying portion may however be arranged to constitute an integrated element.

According to another embodiment of the invention said plurality of pins is axially locked to said chain link via said goods-carrying portion, i.e. the pins cannot be displaced along their longitudinal axis.

According to a further embodiment of the invention said chain link comprises a locking mechanism to lock said goods-carrying portion to the chain link. The goods-carrying portion can be arranged to be able to be displaced with respect to the chain link after it has been attached to the chain link. A displaceable goods-carrying portion can then be locked manually or automatically with such a locking mechanism when the transport chain is in use or when the transport chain is driven along a certain part of a transport path.

Since the construction of the inventive transport chain is not complicated and it is narrow compared to transport chains constructed according to the Cardan joint principle, the size of the goods-carrying portion's sliding surface against a sliding list is not limited.

According to another embodiment of the invention said plurality of pins is cylindrical. The cost of the transport chain can namely be reduced because standard cylindrical pins can be used. The pins can however have any uniform or non-uniform cross section. The pins can be completely or partly made of a metal or an alloy such as steel, plastic, composite material or any other suitable material.

According to a further embodiment of the invention said substantially spherical bearing element comprises a nose section at the front in said transport direction and the surface of the nose section is uneven/rough/coarse, i.e. the surface of the nose section of the substantially spherical bearing element does not have the spherical curvature of the substantially spherical bearing element but is grooved or corrugated for example, so that there is a greater contact surface or more than one contact point between the bearing element and the chain link which accommodates the bearing element when the transport chain is in use. For example, the substantially spherical bearing element can be formed by removing a segment in the nose section, and the surface of the nose section can be made to be grooved or corrugated. Alternatively or additionally, the surface of said substantially spherical element has one or more cavities and/or projections.

According to an embodiment of the invention said chain link comprises a plurality of branches and said substantially spherical bearing element is arranged to be inserted into said cavity past the branches in a direction substantially parallel to the transport direction of the transport chain on assembly of said transport chain. The transport chain is therefore simple and not expensive or time consuming to manufacture and mount or disassemble, and no special tool is necessary on mounting or disassembly.

According to another embodiment of the invention said chain link comprises at least one opening arranged to receive said plurality of pins. This at least one opening can for example be arranged in a chain link's branches.

According to a further embodiment of the invention said substantially spherical bearing element comprises a plurality of components, for example two components.

According to an embodiment of the invention said substantially spherical bearing element is constituted of a plurality of parts that are pivotable with respect to each other.

The present invention also concerns a transport chain system comprising a transport path and a transport chain according to an embodiment of the invention.

According to an embodiment of the invention said transport path is arranged for transporting objects along a transport path that extends in three dimensions, such as a spiral transport path.

BRIEF DESCRIPTION OF THE DRAWINGS

In the following, the present invention will be described in more detail with reference to the accompanying schematic figures in which:

FIG. 1 shows a chain link, a joint segment and a goods-carrying portion according to an embodiment of the present invention, FIG. 2 shows two adjacent chain links of a transport chain according to an embodiment of the present invention.

Figure 3:
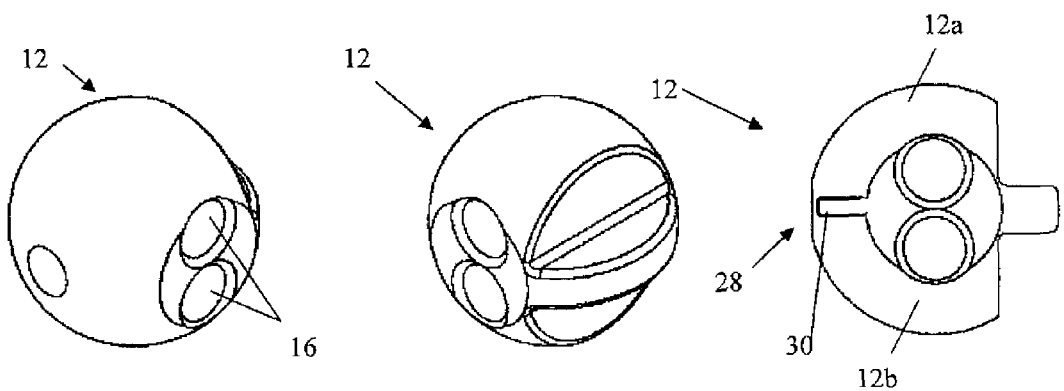
FIG. 3 shows a substantially spherical bearing element according to an embodiment of the present invention.

It should be noted that the drawings have not necessarily been drawn to scale and that the dimensions of certain details may have been exaggerated for the sake of clarity.

DETAILED DESCRIPTION OF THE EMBODIMENTS

FIG. 1 shows a chain link 10 that is intended to be connected to a following similar or identical chain link by means of a joint segment that is placed between the chain link 10 and the following chain link. The joint segment comprises a bearing element 12 and the chain link 10 comprises a cavity 14 with a substantially spherical surface arranged to receive said bearing element 12. The bearing element 12 is substantially spherical and comprises a plurality of through holes 16. The cavity 14 can have a corresponding substantially spherical contact surface for receiving the bearing element 12. The joint segment also comprises a plurality of pins 18 that is arranged in said through holes 16 both in the joint segment and in the following link when the transport chain is in use. The pins 18 create torsional rigidity with respect to the substantially spherical bearing element 12 and the chain link 10 when the transport chain is in use.

The pins 18 can be symmetrically or asymmetrically mounted around the centre of the substantially spherical bearing element 12. The illustrated embodiment shows two pins which extend perpendicularly to the transport direction 20 when the transport chain is in use.

The chain link 10 can for example be completely or partly made of plastic. The pins 18 can be cylindrical steel pins. The pins 18 can for example be 20-100 mm long and/or have a diameter of 3-10 mm depending on the application.

The chain link 10 comprises a separate goods-carrying portion 22 that is arranged to be attached to the chain link 10. The chain link 10 can even comprise a locking mechanism (not shown), such as en hook and eye/hole or Velcro lock in order to at least temporarily lock said goods-carrying portion 22 to the chain link 10 when the transport chain is in use, or when the transport chain is driven upwards or downwards along a spiral transport chain.

The chain link 10 comprises two branches 24 at its rear side, which branches 24 are arranged at a distance from one another. The substantially spherical bearing element 12 is arranged to be inserted into the chain link's cavity 14 past the branches 24 in a direction substantially parallel to the transport direction 20 for the transport chain on assembly of the transport chain. When the substantially spherical bearing element 12 of a following chain link 10 has been inserted into the cavity 14 the pins 18 are inserted through the openings in the chain link 10 and the corresponding openings 16 in the substantially spherical bearing element 12. The goods-carrying portion 22 is for example thereafter attached to the chain link 10 and it locks the pins 18 axially to the chain link 10.

FIG. 2 shows several different views of two adjacent links 10 of a transport chain 26 which have been interconnected by means of a joint segment that comprises a substantially spherical bearing element 12 and a plurality of pins 18, two pins in the illustrated embodiment. All, most, some of, or at least two chain links 10 of a transport chain 26 can be interconnected in this way.

The chain links 10 can be U- or V-shaped or have any other suitable shape. In the illustrated embodiment the chain links are V-shaped. The chain links 10 may for example have an angle between the branches 24 of 30-60°. The diameter of the substantially spherical bearing element 12 can for example be approximately 2-10 times as big as the transverse dimension of the pins 18 or greater. The diameter of the substantially spherical bearing element 12 can be 10-20 mm, for example 16 mm, and the diameter of the pins 18 can be 3-6 mm, for example 4 mm.

FIG. 3 shows the substantially spherical bearing element 12 which comprises a plurality of through holes 16, through which a plurality of pins 18 is inserted when the transport chain is assembled. The substantially spherical bearing element 12 can for example be completely or partly made from a metal or an alloy such as steel, plastic, a composite material or any other suitable material.

The substantially spherical bearing element comprises a nose section 28 at the front in said transport direction. A segment surface has been removed from the nose section 28 and the surface at the nose section is uneven/rough/coarse, i.e. the surface of the nose section is for example grooved or corrugated. According to an embodiment of the invention the substantially spherical bearing element 12 can comprise a plurality of components, for example two components and be constituted of two separate parts 12a and 12b. According to another embodiment of the invention the substantially spherical bearing element 12 can be constituted of a plurality of parts that are pivotable with respect to each other, for example two parts 12a and 12b can be arranged to be pivotable around a pivot centre 30. A plurality of bearing element parts 12a and 12b is thereby connected in such a way that on transmission of force via the pins 18 the bearing element parts 12a and 12b will assume a more optimal contact surface against the chain link's contact surface.

Figure 4:
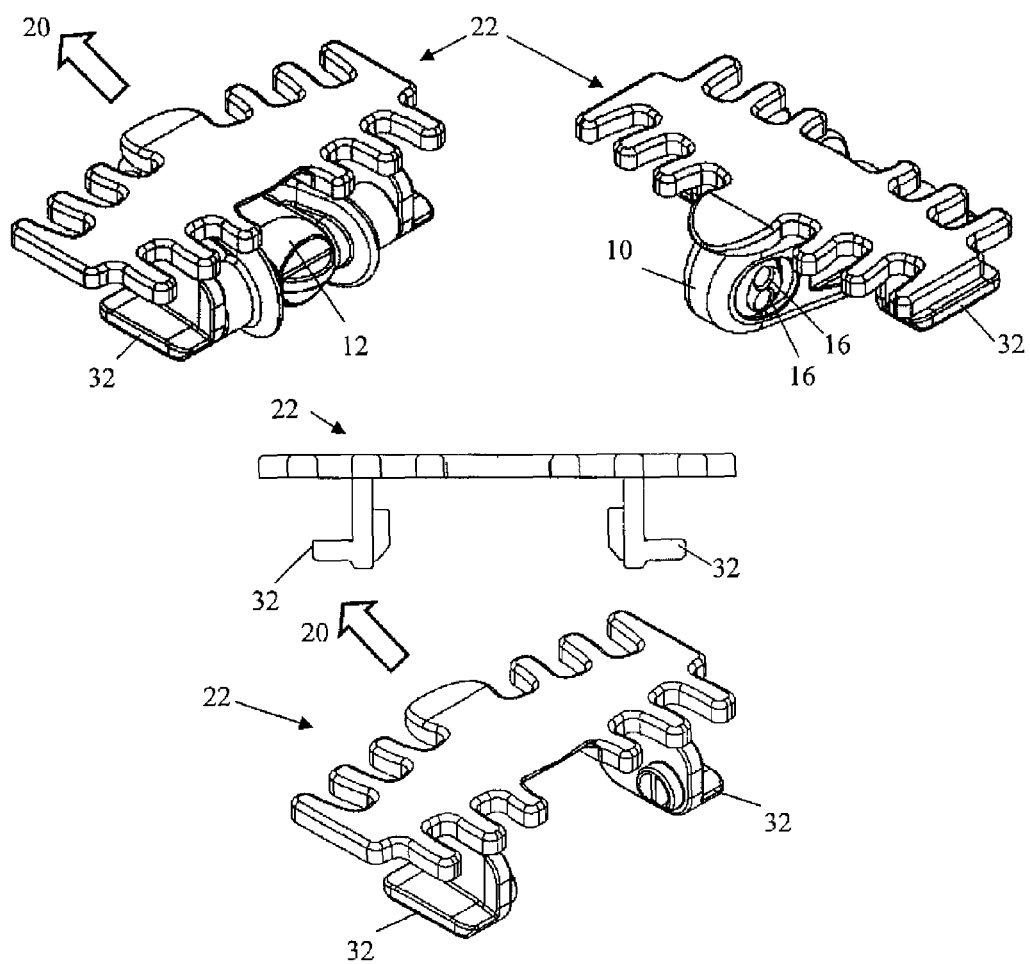
FIG. 4 shows a goods-carrying portion according to an embodiment of the present invention.

FIG. 4 shows a goods-carrying portion 22 according to an embodiment of the invention. The goods-carrying portion 22 comprises a flat surface for transporting objects along a transport path, such as a spiral transport path. On the underside of the goods-carrying portion 22 there is a plurality of projecting flanges 32 that is arranged to cooperate with a conveyor beam's sliding surfaces when the conveyor is in use.

Figure 5:
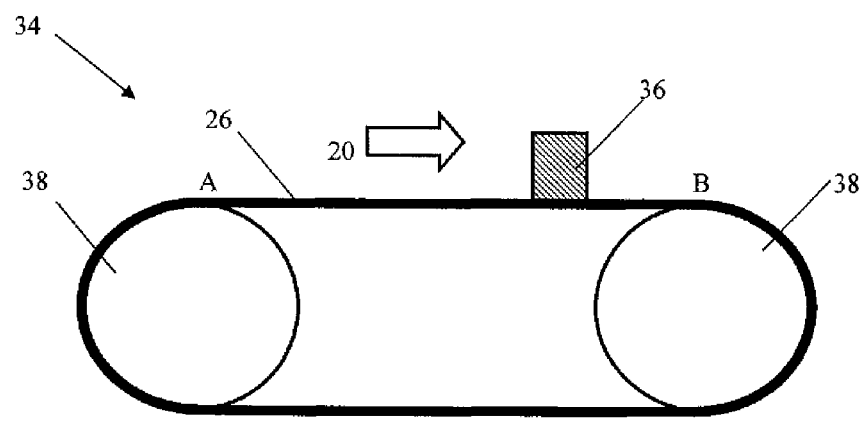
FIG. 5 shows a transport chain system according to an embodiment of the present invention.

FIG. 5 shows a transport chain system 34 comprising a transport chain 26 according to an embodiment of the present invention, which transport chain 26 is arranged to transport objects 36 from position A to B along a transport path in a transport direction 20. The transport chain system 34 comprises a support surface for the transport chain 26 and a drive system, such as a number of motor driven gear wheels 38 that are used to drive the transport chain 26 in one or more transport directions 20. It should be noted that the transport direction 20 can change during the time the transport chain 26 is in use. The transport chain 26 according to the present invention can be driven at high speed, for example at a speed of 100 m/minute or faster.

Several modifications of the invention would be possible within the scope of the accompanying claims. For example, claim 1 recites a transport chain that comprises a plurality of chain links, which is interconnected by means of a joint segment between each chain link. Claim 1 is therefore considered to recite a transport chain in which all, most, some of, or only two of its chain links are interconnected in the way that is recited in claim 1, i.e. certain chain links of the transport chain could be interconnected in some other way.

The invention claimed is:

1. A transport chain for transporting objects along a transport path in a transport direction, which transport chain comprises a plurality of chain links that is interconnected by means of a joint segment between each chain link, which joint segment comprises a bearing element, and whereby each chain link in the part that is located at the back in the transport direction comprises a cavity that is arranged to receive said bearing element, wherein said bearing element is substantially spherical and comprises a plurality of through holes, and that the joint segment also comprises a plurality of pins that is arranged in said through holes in the bearing element and in openings in the chain link and in openings in the following chain link.

2. The transport chain according to claim 1, wherein said plurality of pins is arranged to provide torsional rigidity to said substantially spherical bearing element and said chain link.

3. The transport chain according to claim 1, wherein said plurality of pins is symmetrically mounted around the centre of said substantially spherical bearing element.

4. The transport chain according to claim 1, wherein said plurality of pins is asymmetrically mounted around the centre of said substantially spherical bearing element.

5. The transport chain according to claim 1, wherein said plurality of pins extends perpendicularly to the transport direction.

6. The transport chain according to claim 1, wherein said chain link comprises a separate goods-carrying portion that is arranged to be attached to said chain link.

7. The transport chain according to claim 6, wherein said plurality of pins is axially fixed to said chain link via said goods-carrying portion.

8. The transport chain according to claim 6, wherein said chain link comprises a locking mechanism to lock said goods-carrying portion to the chain link.

9. The transport chain according to claim 1, wherein said plurality of pins is cylindrical.

10. The transport chain according to claim 1, wherein said substantially spherical bearing element comprises a nose section at the front in said transport direction and the surface of the nose section is uneven/rough/coarse.

11. The transport chain according to claim 1, wherein said chain link comprises a plurality of branches and said substantially spherical bearing element is arranged to be inserted into said cavity between the branches in a direction substantially parallel to the transport direction on assembling said transport chain.

12. The transport chain according to claim 11, wherein said chain link comprises at least one opening that is arranged to receive said plurality of pins.

13. The transport chain according to claim 1, wherein said substantially spherical bearing element comprises a plurality of components, for example two components.

14. The transport chain according to claim 1, wherein said substantially spherical bearing element is constituted of a plurality of parts that is pivotable with respect to each other.

15. A transport chain system comprising a transport path and a transport chain, wherein it comprises a transport chain according to any claim 1.

16. The transport chain system according to claim 15, wherein said transport path is arranged for transporting objects along a transport path that extends in three dimensions.

* * * * *